United States Patent
Shirasaka et al.

(10) Patent No.: US 8,210,978 B2
(45) Date of Patent: Jul. 3, 2012

(54) VEHICLE DRIVE UNIT

(75) Inventors: Haruki Shirasaka, Anjo (JP); Yuji Iwatsuru, Anjo (JP); Noriyuki Tani, Toyota (JO); Masayoshi Kato, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 393 days.

(21) Appl. No.: 12/591,747

(22) Filed: Nov. 30, 2009

(65) Prior Publication Data

US 2010/0167874 A1    Jul. 1, 2010

(30) Foreign Application Priority Data

Dec. 25, 2008   (JP) ................. 2008-329716

(51) Int. Cl.
    *F16H 31/00*   (2006.01)
(52) U.S. Cl. ....................................... 475/129
(58) Field of Classification Search ............ 475/128, 475/129
    See application file for complete search history.

(56) References Cited

U.S. PATENT DOCUMENTS

| | | | |
|---|---|---|---|
| 8,016,718 B2 * | 9/2011 | Ohshima et al. ............ | 477/50 |
| 2002/0086759 A1 | 7/2002 | Imai et al. | |
| 2010/0167872 A1 * | 7/2010 | Shirasaka et al. ........... | 477/45 |

FOREIGN PATENT DOCUMENTS

| | | |
|---|---|---|
| JP | A-8-14076 | 1/1996 |
| JP | A 2000-35121 | 2/2000 |
| JP | A-2000-313252 | 11/2000 |
| JP | A 2002-181175 | 6/2002 |
| JP | A 2003-14099 | 1/2003 |
| JP | A 2007-278435 | 10/2007 |

OTHER PUBLICATIONS

International Search Report mailed Feb. 16, 2010 for PCT/JP2009/069525.

* cited by examiner

*Primary Examiner* — Dirk Wright
(74) *Attorney, Agent, or Firm* — Oliff & Berridge, PLC

(57) ABSTRACT

A vehicle drive unit includes a clutch pressure control valve that controls hydraulic pressure for operating the clutch; a clutch control valve that is provided in a first oil passage between the clutch pressure control valve and the clutch, and that controls hydraulic pressure in an engagement state between full engagement and disengagement of the clutch; a second oil passage that bypasses the clutch control valve and that is arranged parallel to the first oil passage; and a shift valve that connects, to an oil passage connected to the clutch, the first oil passage when controlling the engagement state between full engagement and disengagement of the clutch, and the second oil passage when not controlling the engagement state between full engagement and disengagement of the clutch.

4 Claims, 6 Drawing Sheets

VEHICLE DRIVE UNIT

CROSS-REFERENCE TO RELATED APPLICATION

The disclosure of Japanese Patent Application No. 2008-329716 filed on Dec. 25, 2008, including the specification, drawings and abstract is incorporated herein by reference in its entirety.

BACKGROUND

The present invention relates to a vehicle drive unit capable of quickly supplying hydraulic pressure to a clutch and quickly engaging the clutch when restarting an engine from an engine stopped state established by an idle stop function, for example.

In related art, vehicles have been in practical use with a function of automatically stopping an engine (idle stop function) when a predetermined condition is satisfied during traveling in order to reduce fuel consumption, exhaust gas emission, noise, for example. In such vehicles, for example, the engine is stopped when conditions, such as a condition in which the vehicle speed is zero, a condition in which an accelerator pedal is not depressed, and a condition in which a brake is applied, are all satisfied.

When the engine stops, normally, an oil pump connected to the engine also stops. Thus, for example, oil supplied to a forward drive clutch to be engaged during forward traveling is released from an oil passage, resulting in disengagement of the forward drive clutch.

If a predetermined restart condition is satisfied, such as when the accelerator pedal is depressed by the driver, the stopped engine is restarted, and the oil pump is also restarted. At this time, if the forward drive clutch is not quickly engaged as the engine is restarted, the forward drive clutch engages in a state where the engine is racing, resulting in generating an engagement shock.

Thus, various technologies have been proposed for preventing occurrence of engagement shocks. As one example of such technologies, an accumulator capable of accumulating hydraulic pressure is provided branching from an oil passage that connects a forward drive clutch of an automatic transmission and an oil pump for generating the hydraulic pressure to supply the hydraulic pressure to the forward drive clutch (Japanese Patent Application Publication No. 2000-313252). When restarting the engine, the occurrence of engagement shocks is prevented by supplying the hydraulic pressure accumulated in the accumulator to the forward drive clutch, whereby restartability of the engine is enhanced.

SUMMARY

However, in the technology described in Japanese Patent Application Publication No. 2000-313252, there is a problem that the hydraulic pressure accumulated in the accumulator cannot be efficiently supplied to the forward drive clutch in a short period of time when restarting the engine. This is because, when supplying the hydraulic pressure accumulated in the accumulator to the forward drive clutch, the hydraulic pressure may leak because the hydraulic pressure that should be supplied only to the forward drive clutch is also supplied to a hydraulic pressure controller, the oil pump, and the like.

The problem described above can be solved if the capacity of the accumulator is increased. However, enlargement of the accumulator leads to other problems such as enlargement of the drive unit and an increase in cost.

The present invention has been made to solve the problems described above, and it is an object of the present invention to provide a vehicle drive unit provided with a hydraulic circuit capable of efficiently supplying hydraulic pressure from an accumulator to a clutch in a short period of time, while maintaining the required capacity of the accumulator at minimum.

According to a first aspect of the present invention, a vehicle drive unit, which includes: an oil pump that generates hydraulic pressure; a clutch that is controlled by hydraulic pressure and that transmits driving force from a vehicle driving source to an output shaft; a hydraulic pressure controller that controls the hydraulic pressure generated by the oil pump at a predetermined pressure so as to engage the clutch; an accumulator that accumulates the hydraulic pressure generated by the oil pump; and an open/close valve that switches between a blocked state and a communicated state of an oil passage connecting the accumulator and the clutch, and in which the oil pump is driven or stopped as the vehicle drive source is driven or stopped, and the hydraulic pressure accumulated in the accumulator is supplied to the clutch when or before the oil pump is activated, includes: a clutch pressure control valve that controls hydraulic pressure for operating the clutch; a clutch control valve that is provided in a first oil passage between the clutch pressure control valve and the clutch, and that controls hydraulic pressure of an engagement state between full engagement and disengagement of the clutch; a second oil passage that bypasses the clutch control valve and that is arranged parallel to the first oil passage; and a shift valve that connects, to an oil passage connected to the clutch, the first oil passage when controlling the engagement state between full engagement and disengagement of the clutch, and the second oil passage when not controlling the engagement state between full engagement and disengagement of the clutch. In the vehicle drive unit, the accumulator is connected to an oil passage connecting the shift valve and the clutch through the open/close valve, and the second oil passage is provided with a one-way valve that allows oil to flow only in the direction from the oil pump to the shift valve.

The oil pump includes an electrical oil pump that is not connected to an output shaft of a vehicle drive source such as an engine, in addition to a mechanical oil pump connected to the output shaft of the vehicle drive source such as the engine.

In the vehicle drive unit, when the oil pump is driven, the hydraulic pressure generated by the oil pump is controlled at a predetermined pressure to operate the clutch by the hydraulic controller, and then, supplied to the clutch. At this time, the hydraulic pressure generated by the oil pump is accumulated in the accumulator. Then, when or before the oil pump is activated, the hydraulic pressure accumulated in the accumulator is supplied to the clutch.

At this time, since the engagement state between full engagement and disengagement of the clutch is not controlled, the oil passage connected to the clutch is communicated with the second oil passage by the shift valve. Thus, oil is prone to flow from the accumulator to the oil pump side through the second oil passage. However, since the second oil passage is provided with the one-way valve that allows the oil to flow only in the direction from the oil pump to the shift valve, the oil does not flow from the accumulator to the oil pump side through the second oil passage. Thus, the hydraulic pressure from the accumulator is surely prevented from leaking from the hydraulic pressure controller, the oil pump, and the like. Consequently, the hydraulic pressure from the accumulator is supplied only to the clutch, whereby the hydraulic pressure can be efficiently supplied from the accumulator to the clutch in a short period of time.

In the vehicle drive unit, since the hydraulic pressure is not all the time supplied from the accumulator to the clutch when the pump is stopped, the capacity of the accumulator does not need to be increased. Specifically, the accumulator only needs to have a capacity enough for operating the clutch until the hydraulic pressure generated by the oil pump is supplied to the clutch at the start of operation of the oil pump.

Thus, in the vehicle drive unit, the required capacity of the accumulator can be maintained at minimum, and the hydraulic pressure can be efficiently supplied from the accumulator to the clutch in a short period of time. Also, neutral control can be performed.

The vehicle drive unit may further include a manual valve that switches oil passages in accordance with a shift position operation by the driver, the manual valve may be arranged in the oil passage connecting the shift valve and the clutch, and the accumulator may be connected through the open/close valve to the oil passage connecting the shift valve and the manual valve.

With this structure, even if the hydraulic pressure is supplied from the accumulator to the clutch due to a malfunction of the open/close valve in a state where a non-travel position such as a parking position (P range) or a neutral position (N range) is set, the hydraulic pressure can be quickly released from the manual valve. In other words, when the clutch needs no hydraulic pressure, the hydraulic pressure can be surely released from the clutch. Consequently, since a state where the hydraulic pressure is acting on the clutch is not maintained when not necessary, deterioration of reliability and durability of the clutch can be prevented.

The vehicle drive unit may further include a manual valve that switches oil passages in accordance with a shift position operation by the driver. The manual valve may be arranged in the oil passage connecting the shift valve and the clutch. The accumulator may be arranged in the oil passage connecting the manual valve and the clutch.

With this structure, the volume of the oil passage between the accumulator and the clutch can be made small. Thus, the capacity of the accumulator can be made further smaller, and the hydraulic pressure can also be supplied more quickly from the accumulator to the clutch.

Also, with this structure, the oil passage provided with the accumulator and the open/close valve does not need to be connected to an oil passage formed in a valve body of the drive unit. Thus, the degree of freedom in mounting the accumulator and the like can be enhanced.

In the vehicle drive unit, the open/close valve may be placed in a communicated state when the oil pump is driven and is placed in a blocked state when the oil pump is stopped, and the shift valve may connect the first oil passage to an oil passage connected to the clutch during neutral control.

When the vehicle drive unit performs neutral control in which a neutral state is established by adequately controlling the engagement state of the clutch, the shift valve connects the first oil passage provided with the clutch control valve to the oil passage connected with the clutch. Consequently, the neutral control can be surely performed in accordance with pressure adjustment by the clutch control valve.

According to the vehicle drive unit of the present invention, as described above, the hydraulic pressure can be effectively supplied from the accumulator to the clutch in a short period of time, while maintaining the required capacity of the accumulator at minimum.

DETAILED DESCRIPTION OF EMBODIMENTS

Hereinafter, embodiments of a vehicle drive unit according to the present invention will be explained with reference to the drawings. Illustrated here are examples of applying the present invention to a vehicle drive system provided with a continuously variable transmission (CVT).

First Embodiment

Figure 1:
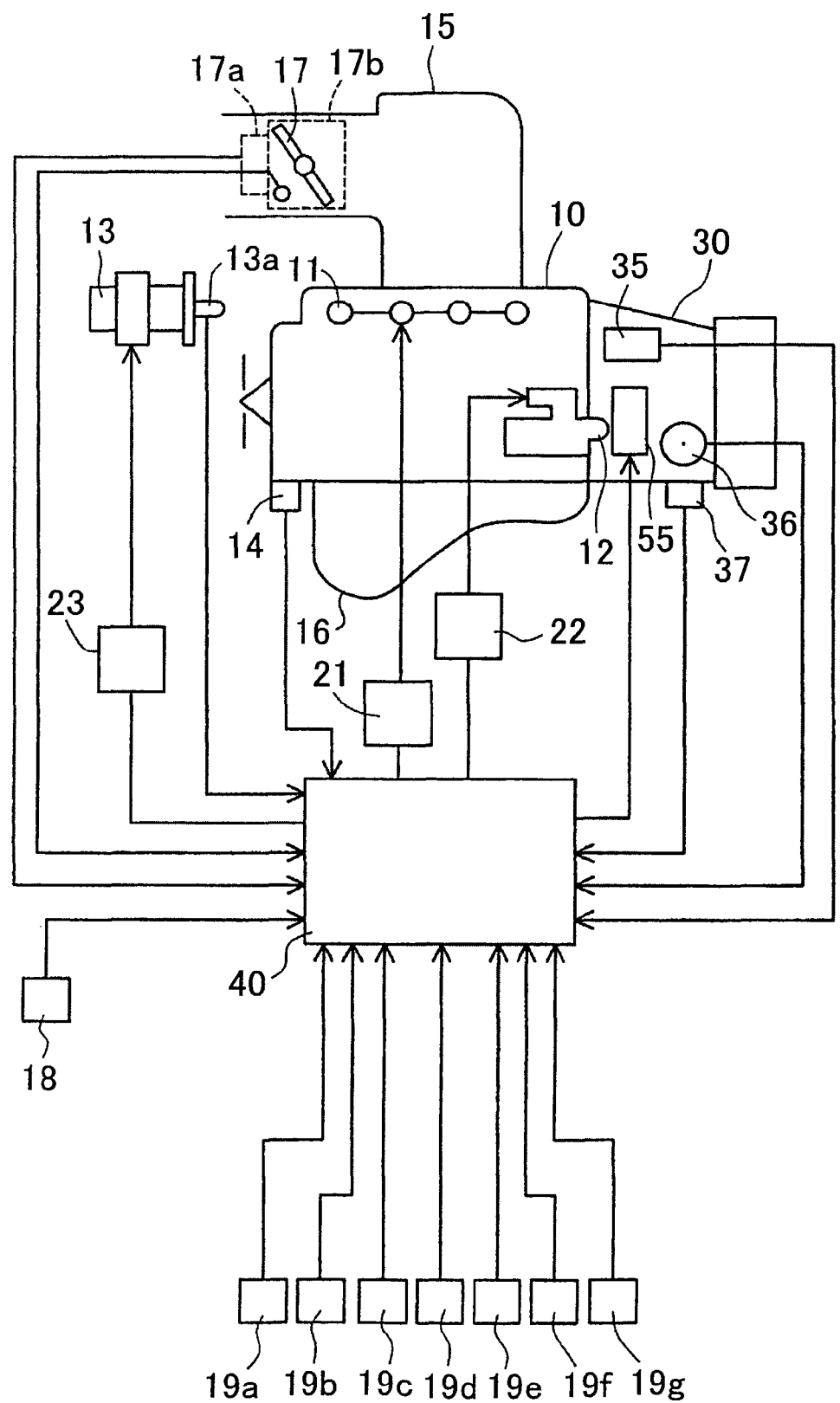
FIG. 1 is a block diagram showing a schematic structure of a vehicle drive system according to a first embodiment of the present invention.

To begin with, a first embodiment of the present invention will be explained. With reference to FIG. 1, a vehicle drive system according to the first embodiment will be explained. FIG. 1 is a block diagram showing a schematic structure of the vehicle drive system according to the first embodiment.

As shown in FIG. 1, the vehicle drive system according to the first embodiment includes: an engine 10; a continuously variable transmission 30; a controller 40 that integrally controls the system; and various sensors that detect states and the like of the engine 10, the continuously variable transmission 30, and the vehicle.

The engine 10 is provided with an injector 11, a starter 12, and an igniter 13. Also, the continuously variable transmission 30 is connected to an output shaft of the engine 10.

An intake manifold 15 and an exhaust manifold 16 are connected to each cylinder of the engine 10. The intake manifold 15 is provided with a throttle valve 17 interlocked with an accelerator pedal. The throttle valve 17 is provided with a throttle position sensor 17a that detects an opening of the throttle valve 17, and an idle switch 17b that detects a fully closed state of the throttle valve 17. The injector 11, the starter 12, and the igniter 13 are connected to the controller 40 through a fuel relay 21, a starter relay 22, and an ignition relay 23, respectively.

The continuously variable transmission 30 is a common belt-type continuously variable transmission. The continuously variable transmission 30 is provided with an input shaft to which an output from the engine 10 is input through a torque converter 38 (see FIG. 2), a forward/reverse drive switching clutch, and the like. The input shaft is provided with a later-described primary pulley 31. The primary pulley 31 includes a fixed sheave and a movable sheave, each of which is coaxially provided, and integrally rotatable, with respect to the input shaft. The fixed sheave is fixed to the input shaft, and the movable sheave is displaceable in the axial direction of the input shaft. Surfaces of the fixed sheave and the movable sheave facing to each other are conical, and a V-belt wound around the primary pulley 31 is interposed between the surfaces facing to each other.

Also, the continuously variable transmission 30 is provided with an output shaft arranged parallel to the input shaft. The output shaft is provided with a later-described secondary pulley 32. The secondary pulley 32 has the same structure as the primary pulley 31, and the V-belt wound around the secondary pulley 32 is interposed therein.

As described above, in the continuously variable transmission 30, the V-belt is wound around the primary pulley 31 and the secondary pulley 32, and power is transmitted from the input shaft to the output shaft through the V-belt. The winding radius of the V-belt around the primary pulley 31 and the winding radius of the V-belt around the secondary pulley 32 are maintained or changed by maintaining or changing the position of the movable sheave with respect to the fixed sheave in each of the pulleys by the hydraulic pressure controlled by a hydraulic circuit 50, which will be described later, whereby the rotating speed ratio of the input shaft to the output shaft, that is, the reduction ratio, is maintained or changed.

Further, the continuously variable transmission 30 is provided with a shift position switch 35 that detects a shift position (range) set by an operation of the driver, and a vehicle speed sensor 36 that detects the vehicle speed based on the rotating speed of the output shaft of the continuously variable transmission 30 coupled to a propulsion shaft. Also, the continuously variable transmission 30 is provided with an oil temperature sensor 37 that detects the temperature of oil in the transmission.

The controller 40 is provided with a central processing unit (CPU) that controls various devices, a read-only memory (ROM) in which various numerical values and programs are written in advance, a random access memory (RAM) having a predetermined area where numerical values and flags of a calculation process are written, and the like. Programs for an engine stop process and an engine restart process to be described later are written in the ROM of the controller 40 in advance.

The controller 40 is connected with an ignition primary coil 13a of the igniter 13, a crank position sensor 14, the throttle position sensor 17a, the idle switch 17b, an ignition switch 18, the shift position switch 35, the vehicle speed sensor 36, the CVT oil temperature sensor 37, a G sensor 19a, a water temperature sensor 19b, a battery voltage sensor 19c, a brake pedal switch 19d, a brake master cylinder pressure sensor 19e, an intake air temperature sensor 19f, an intake air amount sensor 19g, and the like. Also, the controller 40 is connected with a solenoid open/close valve 57 provided in the continuously variable transmission 30 as described later. The controller 40 performs various calculations based on signals from various switches and sensors, and outputs ignition-cutting signals, ignition signals, fuel-cutting signals, fuel injection signals, starter driving signals, driving signals of the solenoid open/close valve 57, and the like.

Figure 2:
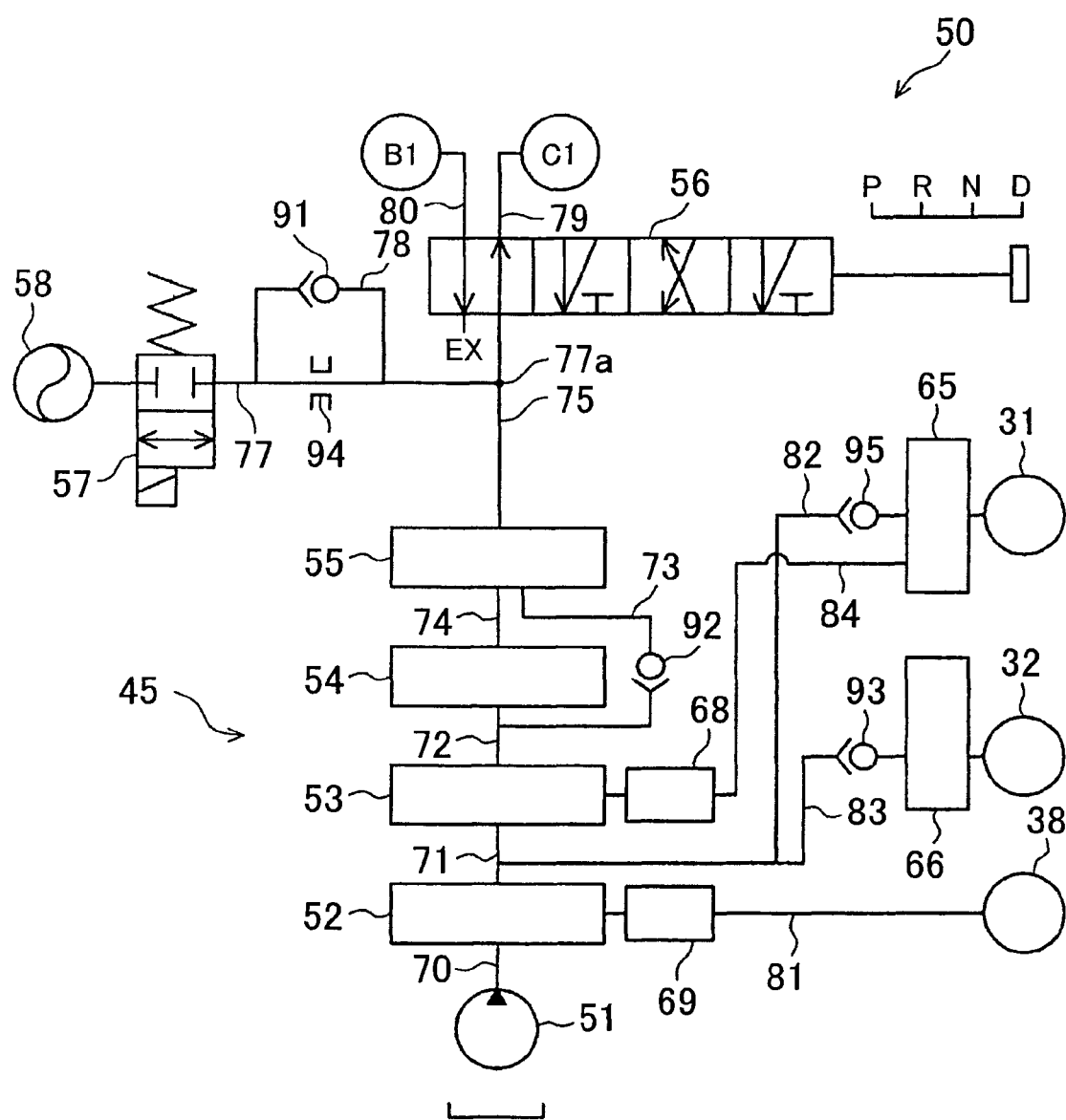
FIG. 2 is a diagram showing a hydraulic circuit provided in a continuously variable transmission.

Here, the hydraulic circuit 50 provided in the continuously variable transmission 30 will be explained with reference to FIG. 2. FIG. 2 is a diagram showing the hydraulic circuit provided in the continuously variable transmission. As shown in FIG. 2, the hydraulic circuit 50 is provided with an oil pump 51, a line pressure regulator valve 52, a clutch pressure control valve 53, a clutch control valve 54, a shift valve 55, a manual valve 56, the solenoid open/close valve 57, an accumulator 58, a shift control valve 65, a secondary sheave pressure control valve 66, a solenoid modulator valve 68, and a regulator valve 69. The hydraulic circuit 50 is connected with a forward drive clutch C1, a reverse drive brake B1, the torque converter 38, and the primary pulley 31 and the secondary pulley 32. In this embodiment, a hydraulic pressure controller 45 is structured with the clutch pressure control valve 53, the clutch control valve 54, the shift valve 55, the shift control valve 65, and the secondary sheave pressure control valve 66.

The oil pump 51 is a hydraulic pressure source of the entire continuously variable transmission 30, and generates the hydraulic pressure by driving force of the engine 10. The line pressure regulator valve 52 controls the hydraulic pressure generated by the oil pump 51 at a predetermined pressure to control the pulley positions of the primary pulley 31 and the secondary pulley 32. The clutch pressure control valve 53 controls the hydraulic pressure (line pressure) adjusted in the line pressure regulator valve 52 at a predetermined pressure to operate the forward drive clutch C1 and the reverse drive brake B1. When controlling an engagement state between full engagement and disengagement of the clutch, for example, when performing neutral control, the clutch control valve 54 controls the hydraulic pressure adjusted in the clutch pressure control valve 53 at a predetermined pressure to operate the forward drive clutch C1. The shift valve 55 selects either the hydraulic pressure adjusted in the clutch pressure control valve 53 or the hydraulic pressure adjusted in the clutch control valve 54 for the hydraulic pressure to be supplied to the forward drive clutch C1 or the reverse drive brake B1. The shift valve 55 selects the hydraulic pressure adjusted in the clutch pressure control valve 53 when there is no need of controlling the engagement state between full engagement and disengagement of the forward drive clutch C1, and selects the hydraulic pressure adjusted in the clutch control valve 54 when there is a need of controlling the engagement state between full engagement and disengagement of the forward drive clutch C1. The solenoid modulator valve 68 adjusts (reduces) the hydraulic pressure adjusted in the clutch pressure control valve 53. The regulator valve 69 adjusts the hydraulic pressure adjusted in the line pressure regulator valve 52 at a predetermined pressure to control the operation of a lock-up clutch provided in the torque converter 38.

The operations of these valves 52 to 55 are controlled by solenoids. By controlling currents supplied to these solenoids, the operations of the valves are controlled.

The manual valve 56 switches oil passages in accordance with a shift position operation by the driver. The accumulator 58 temporarily accumulates the hydraulic pressure generated by the oil pump 51 and adjusted in the clutch pressure control valve 53.

In the hydraulic circuit 50, the oil pump 51 and the line pressure regulator valve 52 are connected through an oil passage 70. The line pressure regulator valve 52 and the clutch pressure control valve 53 are connected through an oil passage 71. The oil passage 71 is branched into oil passages 82 and 83. The oil passages 82 and 83 are connected to the primary pulley 31 and the secondary pulley 32, respectively. More specifically, the oil passage 82 is connected to the primary pulley 31 through the shift control valve 65, and the oil passage 83 is connected to the secondary pulley 32 through a one-way valve 93 and the secondary sheave pressure control valve 66.

The clutch pressure control valve 53 and the clutch control valve 54 are connected through an oil passage 72. The clutch control valve 54 and the shift valve 55 are connected through an oil passage 74. An oil passage structured with these oil passages 72 and 74 is an example of "the first oil passage" of the present invention. Further, the clutch pressure control valve 53 is connected with respect to the shift control valve 65 through an oil passage 84 provided with the solenoid module valve 68. A branched oil passage 73 is formed by being branched from the oil passage 72, and the branched oil passage 73 is connected to the shift valve 55. Accordingly, the oil passage 73 is provided so as to bypass the clutch control valve 54. The branched oil passage 73 is provided with a one-way valve 92 that allows oil to flow only in the direction from the clutch pressure control valve 53 to the shift valve 55. In other words, the one-way valve 92 is arranged parallel to the shift control valve 54. Thus, the shift valve 55 can switch the oil passage to be communicated with an oil passage 75 between the oil passage 74 and the oil passage 73. The branched oil passage 73 is an example of "the second oil passage" of the present invention.

The shift valve 55 and the manual valve 56 are connected through the oil passage 75. The manual valve 56 and the forward drive clutch C1 are connected through an oil passage 79, and the manual valve 56 and the reverse drive brake B1 are connected through an oil passage 80. Thus, when the manual valve 56 is set in a forward drive position (D range), the oil passage 75 and the oil passage 79 are communicated, and the oil passage 80 and a drain EX are connected. Alternatively, when the manual valve 56 is set in a reverse drive position (R range), the oil passage 75 and the oil passage 80 are communicated, and the oil passage 79 and the drain EX are connected. Further, when the manual valve 56 is set in a neutral position (N range) or a parking P position (P range), the oil passage 75 is blocked from both of the oil passages 79 and 80, and the oil passages 79 and 80 are connected to the drain EX. Thus, when the manual valve 56 is set in a position (other than the D range) where there is no need to apply the hydraulic pressure to the forward drive clutch C1, the hydraulic pressure acting on the forward drive clutch C1 is released from the drain EX, and when the manual valve 56 is set in a position (other than the R range) where there is no need to apply the hydraulic pressure to the reverse drive brake B1, the hydraulic pressure acting on the reverse drive brake B1 is released from the drain EX.

The oil passages 79 and 80 are both non-branched oil passages (having no branched portion). The forward drive clutch C1 and the reverse drive brake B1 are directly connected to the manual valve 56 through the oil passages 79 and 80.

An oil passage 77 whose one end connected to the accumulator 58 is connected to the oil passage 75 at a connecting point 77a. The connecting point 77a also serves as a branch point of the oil passage 75 and the oil passage 77. The oil passage 77 is provided with the solenoid open/close valve 57. Opening and closing of the solenoid open/close valve 57 is controlled by the controller 40. When the oil pump 51 is driven, the solenoid open/close valve 57 is opened, and when the oil pump 51 is stopped, the solenoid open/close valve 57 is closed. In other words, the oil passage 77 is communicated or blocked by the opening or closing of the solenoid open/close valve 57. Also, the oil passage 77 is provided with an orifice 94 between the connecting point 77a with the oil passage 75 and the solenoid open/close valve 57. A branched oil passage 78 is provided in a manner bypassing the orifice 94. The branched oil passage 78 is provided with a one-way valve 91 that allows oil to flow only in the direction from the accumulator 58 to the oil passage 75. Thus, when accumulating the hydraulic pressure in the accumulator 58, oil flows through the oil passage 77, and when supplying the hydraulic pressure accumulated in the accumulator 58, oil flows through the branched oil passage 78.

Next, an operation of the vehicle drive system having the structure described above will be explained. In the vehicle drive system according to the present embodiment, for example, when the vehicle is traveling, the oil pump 51 is driven by driving force of the engine 10, and the hydraulic pressure is supplied to the hydraulic circuit 50. In the continuously variable transmission 30, by maintaining or changing the position of the movable sheave with respect to the fixed sheave in each of the primary pulley 31 and the secondary pulley 32 by the hydraulic pressure controlled by the shift control valve 65 and the secondary sheave pressure control valve 66, the winding radius of the V-belt around the primary pulley 31 and the winding radius of the V-belt around the secondary pulley 32 are maintained or changed, whereby the reduction ratio is maintained or changed (shifting is performed). At this time, the hydraulic pressure generated by the oil pump 51 is supplied to, in addition to the continuously variable transmission 30, the accumulator 58 through the oil passages 70 to 75 and 77.

Figure 3:
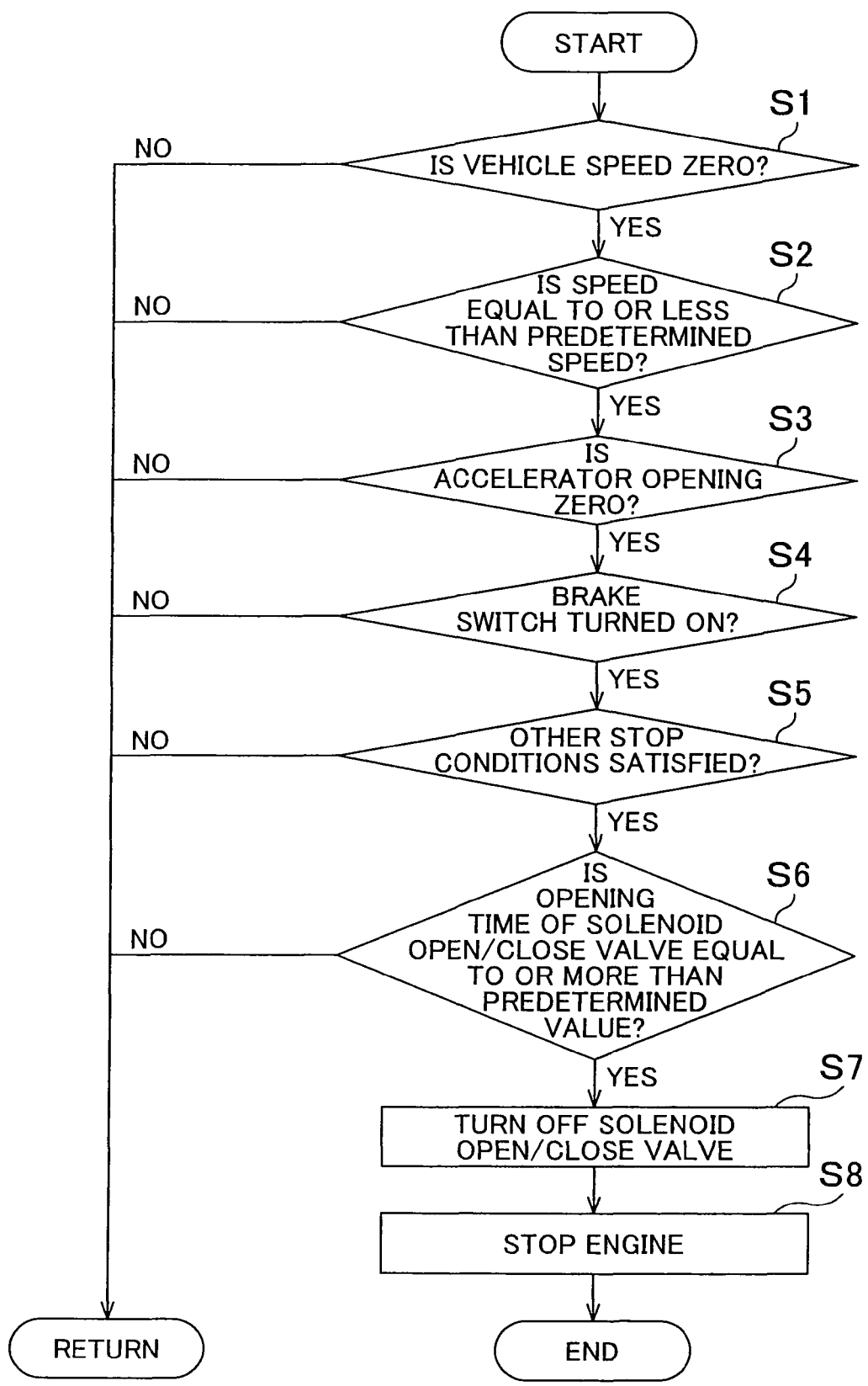
FIG. 3 is a flowchart showing an engine stop process by a controller.

In the vehicle drive system according to the present embodiment, when a predetermined condition is satisfied, the engine 10 is temporarily stopped (idle stop) by the controller 40. With reference to FIG. 3, the engine stop process will be explained. FIG. 3 is a flowchart showing the engine stop process performed by the controller.

At first, the controller 40 determines whether the vehicle speed is zero (step 1). More specifically, based on a vehicle speed signal from the vehicle speed sensor 36, the CPU of the controller 40 determines whether the vehicle speed is zero. If the controller 40 determines that the vehicle speed is zero (S1: YES), the controller 40 subsequently determines whether the engine speed is equal to or less than a predetermined speed (step 2). More specifically, based on an engine speed signal input to the controller 40 from the crank position sensor 14, the CPU of the controller 40 determines whether the engine speed is equal to or less than the predetermined speed. The predetermined speed in step 2 is set to, for example, a speed that is slightly higher than the idle speed. On the other hand, if the controller 40 determines that the vehicle speed is not zero (S1: NO), this process routine is terminated without stopping the engine 10 (idle stop).

In the process of step 2, if the controller 40 determines that the engine speed is equal to or less than the predetermined speed (S2: YES), the controller 40 subsequently determines whether the accelerator opening is zero (step 3). On the other hand, if the controller 40 determines that the engine speed is not equal to or less than the predetermined speed (S2: NO), this process routine is terminated without stopping the engine 10.

More specifically, in step 3, based on an accelerator opening signal from the throttle position sensor 17a, the CPU of the controller 40 determines whether the accelerator opening is zero. The determination as to whether the accelerator opening is zero may be made based on an output signal from the idle switch 17b in addition to the above. In the process of step 3, if the controller 40 determines that the accelerator opening is zero (S3: YES), the controller 40 subsequently determines whether a brake switch is turned ON (step 4). In other words, it is determined whether the brake is applied. On the other hand, if the controller 40 determines that the accelerator opening is not zero (S3: NO), this process routine is terminated without stopping the engine 10.

In step 4, more specifically, based on an output signal from a brake pedal switch 19d, the CPU of the controller 40 determines whether the brake pedal switch is turned ON. In order to more accurately determine whether the brake pedal switch is turned ON, that is, whether a brake device of the vehicle is activated, a detection signal from the brake master cylinder pressure sensor 19e may also be taken into account when making the determination. In this case, it is determined that the brake switch is turned on only when, for example, the brake pedal switch is turned ON, and the pressure detected by the brake master cylinder pressure sensor 19e is equal to or more than a predetermined value.

In the process of step 4, if the controller 40 determines that the brake switch is turned ON (S4: YES), the controller 40 subsequently determines whether other engine stop conditions are satisfied (step 5). On the other hand, if the controller 40 determines that the brake switch is not tuned ON (S4: NO), this process routine is terminated without stopping the engine 10.

Examples of other engine stop conditions in the process of step 5 include: uphill/slope determination based on an output signal from the G sensor 19a (the condition is satisfied if the slope angle is equal to or less than a predetermined value); engine water temperature determination based on an output signal from the water temperature sensor 19b (the condition is satisfied if the water temperature is within a predetermined range); battery voltage determination based on an output signal from the battery voltage sensor 19c (the condition is satisfied if the battery voltage is equal to or more than a predetermined value); CVT oil temperature determination based on an output signal from the oil temperature sensor 37 (the condition is satisfied if the CVT oil temperature is within a predetermined range); elapsed time from the previous engine start (the condition is satisfied if the elapsed time is equal to or more than a predetermined time); and a vehicle speed history (the condition is satisfied if the vehicle speed is equal to or more than a predetermined value).

In the process of step 5, if the other engine stop conditions are all satisfied, that is, if the determinations made in the processes of steps 1 to 5 are all YES (S5: YES), it is determined whether predetermined hydraulic pressure is accumulated in the accumulator 58. More specifically, it is determined whether the opening time of the solenoid open/close valve 57, that is, the elapsed time after the start of supplying the hydraulic pressure from the oil pump 51 to the accumulator 58 through the solenoid open/close valve 57 is equal to or more than a predetermined value (step 6). The predetermined value may be set to the time taken for the hydraulic pressure in the accumulator 58 to reach a predetermined value or more, and determined in accordance with the capacity of the accumulator 58. Further, a hydraulic sensor for measuring the hydraulic pressure accumulated in the accumulator 58 may be provided so as to determine whether the predetermined hydraulic pressure is accumulated in the accumulator 58 based on an output signal from the hydraulic sensor. In this case, the hydraulic sensor is arranged between the solenoid open/close valve 57 and the accumulator 58.

On the other hand, if all of the other engine stop conditions are not satisfied (S5: NO), this process routine is terminated without stopping the engine 10.

In the process of step 6, if it is determined that the opening time of the solenoid open/close valve 57 is equal to or more than the predetermined value, that is, the predetermined hydraulic pressure is accumulated in the accumulator 58 (S6: YES), the oil passage (oil passage 77 in this embodiment) that connects the oil pump 51 and the accumulator 58 is blocked by the solenoid open/close valve 57. More specifically, after power to the solenoid open/close valve 57 is turned OFF (step 7), the engine 10 is stopped (step 8). More specifically, the controller 40 outputs the fuel-cutting signal and the ignition-cutting signal, which serve as engine stop signals, to the fuel relay 21 and the ignition relay 23, respectively. This stops supply of high voltage from the igniter 13 to a spark plug, and also stops fuel injection from the injector 11, whereby the engine 10 is stopped (idle stop). On the other hand, if it is determined that the opening time of the solenoid open/close valve 57 is less than the predetermined value, that is, the predetermined hydraulic pressure is not accumulated in the accumulator 58 (S6: NO), this process routine is terminated without stopping the engine 10.

Figure 4:
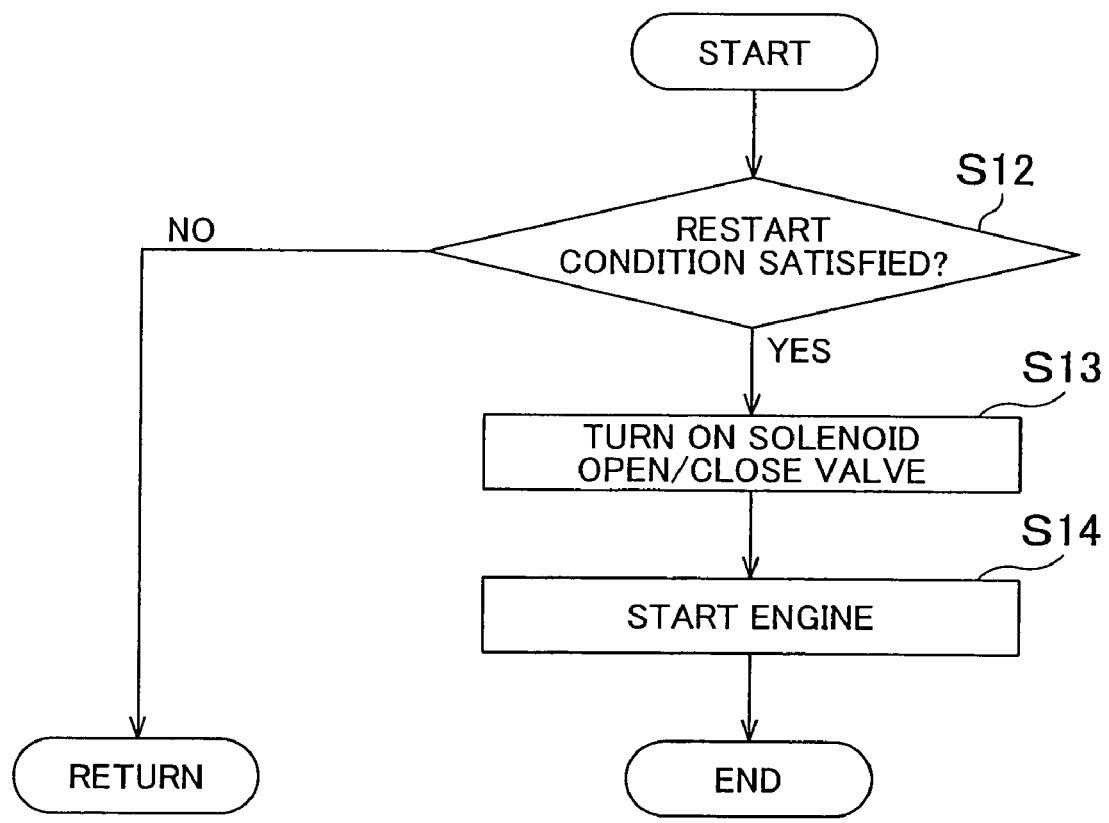
FIG. 4 is a flowchart showing an engine restart process by the controller.

Here, since the oil pump 51 stops as the engine 10 stops, the hydraulic pressure is not supplied to the hydraulic circuit 50. However, since the solenoid open/close valve 57 is turned OFF and the oil passage 77 is blocked, the hydraulic pressure is accumulated in the accumulator 58. When the engine 10 is temporarily stopped as described above, the controller 40 performs a restart process routine of the engine 10 after idle stop. At this time, the oil passage 75 is connected with the oil passage 73 by the shift valve 55. With reference to FIG. 4, the restart process after the idle stop (temporary stop) of the engine will be explained. FIG. 4 is a flowchart showing the engine restart process after idle stop, which is performed by the controller 40.

At first, the controller 40 determines whether an engine restart condition is satisfied (step 12). Examples of the engine restart condition in the process of step 12 include a condition in which the vehicle speed is zero, a condition in which the brake switch is turned OFF, and a condition in which the accelerator opening is not zero.

In the process of step 12, if the engine restart condition is satisfied (S 12: YES), the solenoid open/close valve 57 is energized and opened (placed in an ON state) (step 13), and then, the engine 10 is restarted (step 14). More specifically, the fuel injection signal, the ignition signal, and the starter driving signal, which serve as engine restarting signals, are output from the controller 40 to the fuel relay 21, the ignition relay 23, and the starter relay 22, respectively. This drives the starter 12, and activates supply of high voltage from the igniter 13 to the spark plug and fuel injection from the injector 11, whereby the engine 10 is restarted. On the other hand, if the engine restart condition is not satisfied (S 12: NO), this process routine is terminated.

When the engine 10 is restarted as described above, since the solenoid open/close valve 57 is energized and opened, the oil passage 77 is placed in a communicated state. Thus, the accumulator 58 communicates with the oil passage 75. Consequently, the hydraulic pressure accumulated in the accumulator 58 is supplied from the oil passages 77 and 78 to the oil passage 75. Since the oil passage 77 is provided with the orifice 94, the hydraulic pressure from the accumulator 58 is supplied to the oil passage 75 through the oil passage 78 (bypassing the orifice 94).

The hydraulic pressure supplied to the oil passage 75 is supplied from the oil passage 79 to the forward drive clutch C1 through the manual valve 56. Here, at the time of starting the engine, the oil passage 75 is communicated with the branched oil passage 73 by the shift valve 55, because neutral control is not performed when the engine is started. Thus, the hydraulic pressure supplied to the oil passage 75 is supplied to the branched oil passage 73 in addition to the forward drive clutch C1. However, since the branched oil passage 73 is provided with the one-way valve 92 that allows oil to flow only in the direction from the clutch pressure control valve 53 to the shift valve 55, the oil that has flown into the branched oil passage 73 does not flow to the clutch pressure control valve 53. Thus, the hydraulic pressure supplied from the accumulator 58 to the oil passage 75 is not released from the clutch pressure control valve 53, the oil pump 51, and the like. Consequently, since the hydraulic pressure from the accumulator 58 is supplied only to the forward drive clutch C1, the hydraulic pressure can be efficiently supplied from the accumulator 58 to the forward drive clutch C1 in a short period of time.

As described above, when the oil pump 51 is stopped, the hydraulic pressure is not all the time supplied from the accumulator 58 to the forward drive clutch C1. Thus, the accumulator 58 only needs to have a capacity enough for supplying the hydraulic pressure to the forward drive clutch C1 until the hydraulic pressure generated by the oil pump 51 is supplied to the forward drive clutch C1 at the start of operation of the oil pump 51.

Thus, according to the vehicle drive system of the present embodiment, while maintaining the required capacity of the accumulator 58 at minimum, the hydraulic pressure can be efficiently supplied from the accumulator 58 to the forward drive clutch C1 in a short period of time when restarting the engine. Also, the manual valve 56 and the forward drive clutch C1 are directly connected through the non-branched oil passage 79. Therefore, when supplying the hydraulic pressure from the accumulator 58 to the forward drive clutch C1 at the restart of the engine, resistance that occurs as oil flows toward the forward drive clutch C1 can be reduced as much as possible, and the length of the oil passage can be made short. Thus, the hydraulic pressure can be supplied from the accumulator 58 to the forward drive clutch C1 very efficiently in a much shorter period of time.

When neutral control is performed when the engine 10 is driven, the shift valve 55 switches the oil passage to be communicated with the oil passage 75 from the oil passage 73 to the oil passage 74. Thus, the oil passage 75 is supplied with the hydraulic pressure adjusted by the clutch control valve 54. Then, the hydraulic pressure is supplied to the forward drive clutch C1 through the manual valve 56 and the oil passage 79. As described above, in the vehicle drive system according to the present embodiment, the neutral control can be performed by controlling the clutch control valve 54 and the shift valve 55.

Further, the oil passage 77 is provided with the orifice 94, and the branched oil passage 78 is arranged parallel to the oil passage 77 in a manner to bypass the orifice 94. Further, the branched oil passage 78 is provided with the one-way valve 91 that allows oil to flow only in the direction from the accumulator 58 to the oil passage 75. Thus, when using the hydraulic pressure accumulated in the accumulator 58 upon restart of the engine 10, the hydraulic pressure can be quickly (at high speed) supplied from the accumulator 58 to the forward drive clutch C1 through the oil passage 78 provided with the one-way valve 91.

On the other hand, when the oil pump 51 is driven, the hydraulic pressure generated by the oil pump 51 is supplied to the accumulator 58 through the oil passage 77 provided with the orifice 94. Thus, the hydraulic pressure is slowly (at low speed) accumulated in the accumulator 58. Consequently, when the oil pump 51 is activated at the restart of the engine 10, the hydraulic pressure generated by the oil pump 51 is not so much used for accumulation of the hydraulic pressure in the accumulator 58 in a state where the hydraulic pressure accumulated in the accumulator 58 is lowered right after the hydraulic pressure accumulated in the accumulator 58 is supplied to the forward drive clutch C1. Thus, when the oil pump 51 is activated, the hydraulic pressure generated by the oil pump 51 can be quickly (at high speed) supplied to the forward drive clutch C1. Consequently, the required capacity of the accumulator 58 can be made further smaller.

The oil passage 83 is provided with the one-way valve 93 on the upstream side of the secondary sheave pressure control valve 66 that allows oil to flow only in the direction from the line pressure regulator valve 52 to the secondary pulley 32. Thus, when the oil pump 51 is stopped, oil leakage from the secondary pulley 32 to the line pressure regulator valve 52 can be prevented. Consequently, oil leakage in the secondary pulley 32 can be prevented, and intrusion of the air can be prevented. Thus, after the engine 10 is restarted, mixing of air into the oil supplied from the oil pump 51 can be prevented, and hydraulic performance after the engine is restarted can be enhanced.

Similarly, the oil passage 82 is provided with a one-way valve 95 on the upstream side of the shift control valve 65 that allows oil to flow only in the direction from the line pressure regulator valve 52 to the primary pulley 31. Thus, when the oil pump 51 is stopped, oil leakage from the primary pulley 31 to the line pressure regulator valve 52 can be prevented. Consequently, oil leakage in the primary pulley 31 can be prevented, and intrusion of the air can be prevented. Thus, after the engine 10 is restarted, mixing of air into the oil supplied from the oil pump 51 can be prevented, and hydraulic performance after the engine is restarted can be enhanced.

In a state where the manual valve 56 is set to the non-travel position such as the P range or the N range, the forward drive clutch C1 or the reverse drive brake B1, or the both are connected to the drain EX. Thus, even if the hydraulic pressure is supplied from the accumulator 58 to the forward drive clutch C1 or the reverse drive brake B1 due to a malfunction of the solenoid open/close valve 57 in a state where the non-travel poison such as the P range or the N range is set, the hydraulic pressure can be quickly released from the manual valve 56. In other words, when the forward drive clutch C1 or the reverse drive brake B1 needs no hydraulic pressure, the hydraulic pressure can be surely released from the forward drive clutch C1 or the reverse drive brake B1. Thus, a state where the hydraulic pressure is acting on the forward drive clutch C1 or the reverse drive brake B1 is not maintained when not necessary, whereby deterioration of reliability and durability of the forward drive clutch C1 or the reverse drive brake B1 can be prevented.

With the vehicle drive system according to the first embodiment as described above in detail, the oil passage 75 connecting the shift valve 55 and the manual valve 56 is connected with the accumulator 58 by the oil passages 77 and 78 via the solenoid open/close valve 57. The shift valve 55 is connected with the oil passage 74 connected to the clutch control valve 54, and with the branched oil passage 73 that is branched from the oil passage 72 and arranged parallel to the shift control valve 54. Also, the branched oil passage 73 is provided with the one-way valve 92 that allows oil to flow only in the direction from the clutch pressure control valve 53 to the shift valve 55. When the oil pump 51 is driven, the controller 40 energizes the solenoid open/close valve 57 and the solenoid open/close valve 57 is opened, whereby the oil passage 77 is placed in a communicated state. When the oil pump 51 is stopped, the controller 40 stops energizing the solenoid open/close valve 57 and the solenoid open/close valve 57 is closed, whereby the oil passage 77 is placed in a blocked state.

When the oil pump 51 is driven, the hydraulic pressure generated by the oil pump 51 is accumulated in the accumulator 58. When the engine 10 is stopped and the oil pump 51 is stopped, the solenoid open/close valve 57 is placed in a blocked state, and the hydraulic pressure accumulated in the accumulator 58 is maintained. When the engine 10 is restarted under such a state, the hydraulic pressure accumulated in the accumulator 58 is supplied to the forward drive clutch C1. At this time, since the shift valve 55 connects the oil passage 75 with the branched oil passage 73, the hydraulic pressure from the accumulator 58 can be surely prevented from leaking from the clutch pressure control valve 53, the oil pump 51, and the like. When the engine 10 is restarted and the oil pump 51 is driven, the hydraulic pressure generated by the oil pump 51 is supplied to the oil passage 75 through the branched oil passage 73. Thus, the hydraulic pressure generated by the oil pump 51 can be surely supplied to the forward drive clutch C1 before the hydraulic pressure supplied from the accumulator 58 is released. In this manner, since the hydraulic pressure is not all the time supplied from the accumulator 58 to the forward drive clutch C1 when the oil pump 51 is stopped, the capacity of the accumulator 58 can be made small. Thus, with the vehicle drive system according to the first embodiment, the required capacity of the accumulator 58 can be maintained at minimum, and the hydraulic pressure can be efficiently supplied from the accumulator 58 to the forward drive clutch C1 in a short period of time.

Further, since the shift valve 55 switches the oil passage to be communicated with the oil passage 75 from the oil passage 73 to the oil passage 74, neutral control can be performed.

Second Embodiment

Figure 5:
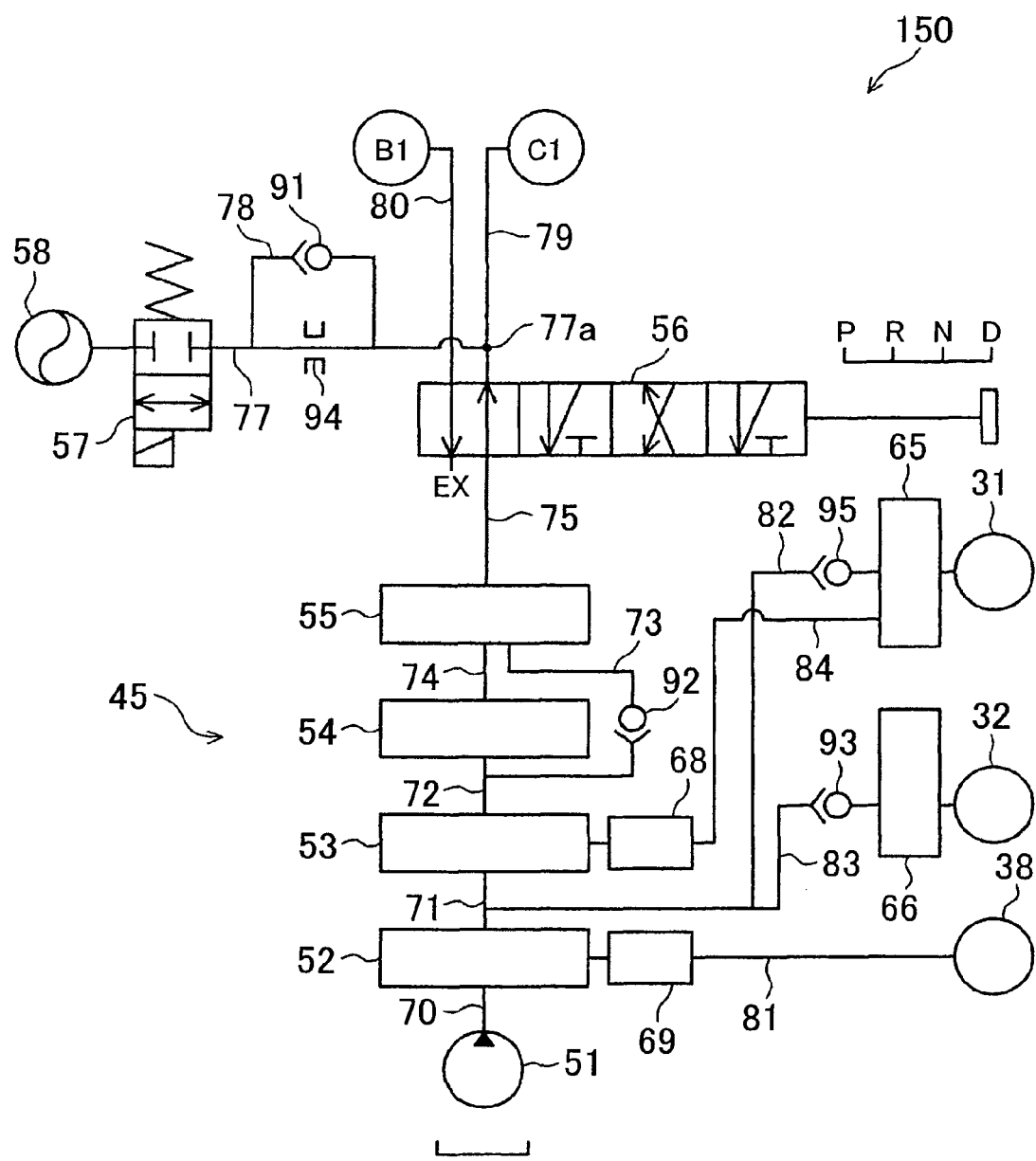
FIG. 5 is a diagram showing a hydraulic circuit of a vehicle drive system according to a second embodiment of the present invention.

A second embodiment of the present invention will be explained next. The second embodiment has the basic structure that is almost the same as the structure of the first embodiment, but differs from the first embodiment in the structure of a hydraulic circuit provided in a continuously variable transmission. With reference to FIG. 5, the hydraulic circuit of a vehicle drive system according to the second embodiment will be explained. FIG. 5 is a diagram showing the hydraulic circuit of the vehicle drive system according to the second embodiment. Hereinafter, the same components as those of the first embodiment are denoted by the same reference numerals, and the descriptions thereof are omitted. The following explanation will focus on differences in structures.

As shown in FIG. 5, in a hydraulic circuit 150, the position of the manual valve 56 is different from that in the hydraulic circuit 50 of the first embodiment. More specifically, the manual valve 56 is arranged between the line pressure regulator valve 52 and a cutoff valve 60. More preferably, the manual valve 56 is arranged between the shift valve 55 and the contacting point 77a of the oil passage 77. By such a change of arrangement of the manual valve 56, the oil passage 77 connected with the accumulator 58 is connected at the connecting point 77a to the oil passage 79 connected to the forward drive clutch C1. Thus, compared to the first embodiment, since the oil passage 77 is arranged at a position closer to the forward drive clutch C1, the length of the oil passage from the accumulator 58 to the forward drive clutch C1 can be made short, and the volume of the oil passage can be made small.

As described in the first embodiment, in the hydraulic circuit 150, when the oil pump 51 is driven, the hydraulic pressure generated by the oil pump 51 is accumulated in the accumulator 58. When the engine 10 is stopped, the solenoid open/close valve 57 is turned OFF, whereby the oil passage 77 is placed in a blocked state. Thus, the hydraulic pressure accumulated in the accumulator 58 is maintained. When the engine 10 is restarted under such a state, the solenoid open/close valve 57 is turned ON, whereby the oil passage 77 is placed in a communicated state. Consequently, the accumulator 58 communicates with the oil passage 79. Thus, the hydraulic pressure accumulated in the accumulator 58 is supplied from the oil passages 77 and 78 to the oil passage 79. Since the orifice 94 is provided in the oil passage 77, the hydraulic pressure from the accumulator 58 is supplied to the oil passage 79 through the oil passage 78 (bypassing the orifice 94), and supplied to the forward drive clutch C1.

Here, although the hydraulic pressure supplied from the accumulator 58 to the oil passage 77 is also supplied to the branched oil passage 73 through the oil passage 75, the oil passage 73 is blocked by the one-way valve 92. Thus, the hydraulic pressure supplied to the oil passages 75 and 73 is not released from the clutch pressure control valve 53, and the like. Consequently, the hydraulic pressure from the accumulator 58 is supplied only to the forward drive clutch C1. Since the volume of the oil passage from the accumulator 58 to the forward drive clutch C1 is made small, the hydraulic pressure can be efficiently supplied from the accumulator 58 to the forward drive clutch C1, and the time required for supplying the hydraulic pressure can be further shortened. Also, the capacity of the accumulator 58 can be made further smaller.

Thus, with the vehicle drive system according to the second embodiment, the required capacity of the accumulator 58 can be maintained at minimum, and the hydraulic pressure can be more efficiently supplied from the accumulator 58 to the forward drive clutch C1 in a shorter period of time.

Further, with the vehicle drive system according to the second embodiment, the oil passage 77 connected with the accumulator 58 does not need to be connected to an oil passage provided in a valve body of the hydraulic circuit 150. Thus, the degree of freedom in mounting the accumulator 58 can be enhanced. The vehicle drive system according to the second embodiment also provides other advantageous effects described in the first embodiment.

Third Embodiment

Figure 6:
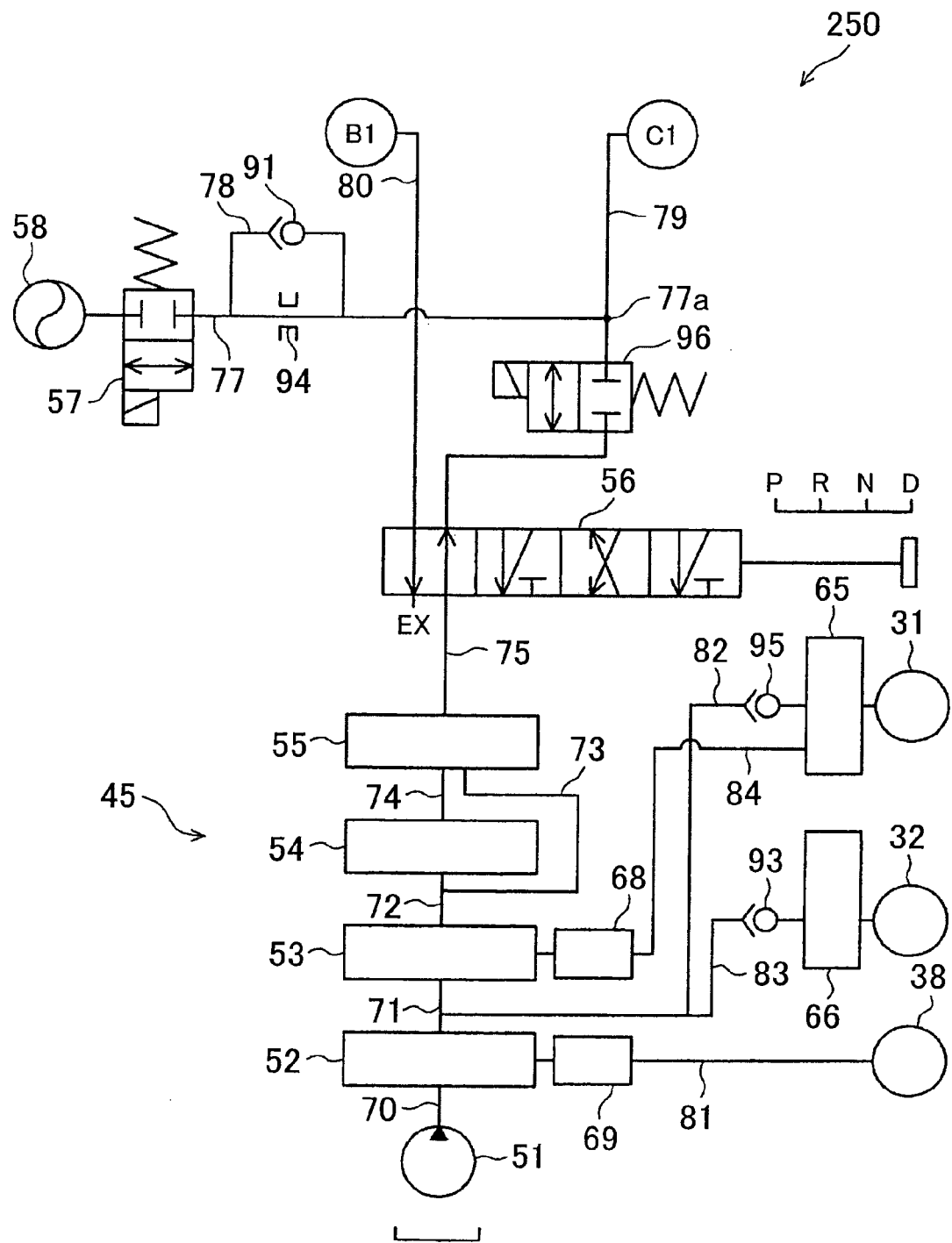
FIG. 6 is a diagram showing a hydraulic circuit of a vehicle drive system according to a third embodiment of the present invention.

A third embodiment of the present invention will now be explained. The third embodiment has the basic structure that is almost the same as the structure of the second embodiment, but differs from the second embodiment in the structure of a hydraulic circuit provided in a continuously variable transmission. With reference to FIG. 6, the hydraulic circuit of a vehicle drive system according to the third embodiment will be explained. FIG. 6 is a diagram showing the hydraulic circuit of the vehicle drive system according to the third embodiment. Hereinafter, the same components as those of the second embodiment are denoted by the same reference numerals, and the descriptions thereof are omitted. The following explanation will focus on differences in structures.

As shown in FIG. 6, in a hydraulic circuit 250, compared to the hydraulic circuit 150 of the second embodiment, instead of providing a one-way valve in the branched oil passage 73, a solenoid open/close valve 96 for opening and closing an oil passage is provided in the oil passage 79. The solenoid open/close valve 96 is arranged between the connecting point 77a and the manual valve 56 in the oil passage 79. The oil passage 79 is blocked only when the hydraulic pressure is supplied from the accumulator 58 to the forward drive clutch C1.

In such a hydraulic circuit 250, as explained in the second embodiment, when the oil pump 51 is driven, the hydraulic pressure generated by the oil pump 51 is accumulated in the accumulator 58. When the engine 10 is stopped, power to the solenoid open/close valve 57 is turned OFF and the solenoid open/close valve 57 is closed, whereby the oil passage 77 is placed in a blocked state. Thus, the hydraulic pressure accumulated in the accumulator 58 is maintained. When the engine 10 is restarted under such a state, the solenoid open/close valve 57 is energized and opened, whereby the oil passage 77 is placed in a communicated state. Thus, the accumulator 58 communicates with the oil passage 79. Consequently, the hydraulic pressure accumulated in the accumulator 58 is supplied from the oil passages 77 and 78 to the oil passage 79. Since the orifice 94 is provided in the oil passage 77, the hydraulic pressure from the accumulator 58 is supplied to the oil passage 79 through the oil passage 78 (bypassing the orifice 94), and supplied to the forward drive clutch C1.

At this time, since the power to the solenoid open/close valve 96 is turned OFF and the solenoid open/close valve 96 is closed, the oil passage 79 is blocked between the contacting point 77a and the manual valve 56. Thus, the hydraulic pressure supplied from the accumulator 58 to the oil passage 79 through the oil passage 77 is not supplied from the solenoid open/close valve 96 to the clutch pressure control valve 53 side. Consequently, the hydraulic pressure supplied to the oil passage 79 is not released from the clutch pressure control valve 53 and the like. Therefore, the hydraulic pressure from the accumulator 58 is supplied only to the forward drive clutch C1. The volume of the oil passage from the accumulator 58 to the forward drive clutch C1 is made small. Thus, the hydraulic pressure can be efficiently supplied from the accumulator 58 to the forward drive clutch C1, and the time required for supplying the hydraulic pressure can be further shortened. Compared to the second embodiment, an amount of oil supplied to the opposite side of the forward drive clutch C1 in the oil passage 79 in the hydraulic pressure supplied from the accumulator 58 is made small. Therefore, the capacity of the accumulator 58 can be made further smaller.

Thus, in the vehicle drive system according to the third embodiment, the capacity of the accumulator 58 can be made further smaller, and the hydraulic pressure can be efficiently supplied from the accumulator 58 to the forward drive clutch C1 in a much shorter period of time.

Further, in the vehicle drive system according to the third embodiment, the oil passage 77 connected to the accumulator 58 does not need to be connected to an oil passage provided in a valve body of the hydraulic circuit 250. Thus, the degree of freedom in mounting the accumulator 58 can be enhanced. The vehicle drive system according to the third embodiment also provides other advantageous effects described in the first embodiment.

The embodiments mentioned above are merely examples, and the present invention is not limited thereto. Various modifications and variations may be made within the scope of the present invention. In the embodiments above, examples of applying the present invention to a vehicle drive system provided with a continuously variable transmission are explained. However, the present invention is not limited to these examples, and may be applied to, for example, a vehicle drive system provided with a stepped automatic transmission (A/T).

In the embodiments described above, the mechanical oil pump 51 connected to the engine 10 is shown as an example. However, the present invention may be also applied to a vehicle drive system provided with an electrical oil pump that is not connected to the engine.

Further, in the embodiments described above, normally-closed valves are shown as examples of the solenoid open/close valves 57 and 96. However, normally-open valves may also be used. In this case, energization control of the solenoid open/close valve is performed in a reverse manner to the descriptions mentioned above.

What is claimed is:

1. A vehicle drive unit that includes: an oil pump that generates hydraulic pressure; a clutch that is controlled by hydraulic pressure and that transmits driving force from a vehicle driving source to an output shaft; a hydraulic pressure controller that controls the hydraulic pressure generated by the oil pump at a predetermined pressure so as to engage the clutch; an accumulator that accumulates the hydraulic pressure generated by the oil pump; and an open/close valve that switches between a blocked state and a communicated state of an oil passage connecting the accumulator and the clutch, wherein the oil pump is driven or stopped as the vehicle drive source is driven or stopped, and the hydraulic pressure accumulated in the accumulator is supplied to the clutch when or before the oil pump is activated, the vehicle drive unit comprising:

a clutch pressure control valve that controls hydraulic pressure for operating the clutch;

a clutch control valve that is provided in a first oil passage between the clutch pressure control valve and the clutch, and that controls hydraulic pressure in an engagement state between full engagement and disengagement of the clutch;

a second oil passage that bypasses the clutch control valve and that is arranged parallel to the first oil passage; and a shift valve that connects, to an oil passage connected to the clutch, the first oil passage when controlling the engagement state between full engagement and disengagement of the clutch, and the second oil passage when not controlling the engagement state between full engagement and disengagement of the clutch, wherein the accumulator is connected to an oil passage connecting the shift valve and the clutch through the open/close valve, and the second oil passage is provided with a one-way valve that allows oil to flow only in the direction from the oil pump to the shift valve.

2. The vehicle drive unit according to claim 1, further comprising:

a manual valve that switches oil passages in accordance with a shift position operation by the driver, wherein the manual valve is arranged in the oil passage connecting the shift valve and the clutch, and the accumulator is connected through the open/close valve to the oil passage connecting the shift valve and the manual valve.

3. The vehicle drive unit according to claim 1, further comprising:

a manual valve that switches oil passages in accordance with a shift position operation by the driver; wherein the manual valve is arranged in the oil passage connecting the shift valve and the clutch, and the accumulator is arranged in the oil passage connecting the manual valve and the clutch.

4. The vehicle drive unit according to claim 1, wherein the open/close valve is placed in a communicated state when the oil pump is driven, and is placed in a blocked state when the oil pump is stopped, and the shift valve connects the first oil passage to an oil passage connected to the clutch during neutral control.

* * * * *